Patented Oct. 9, 1945

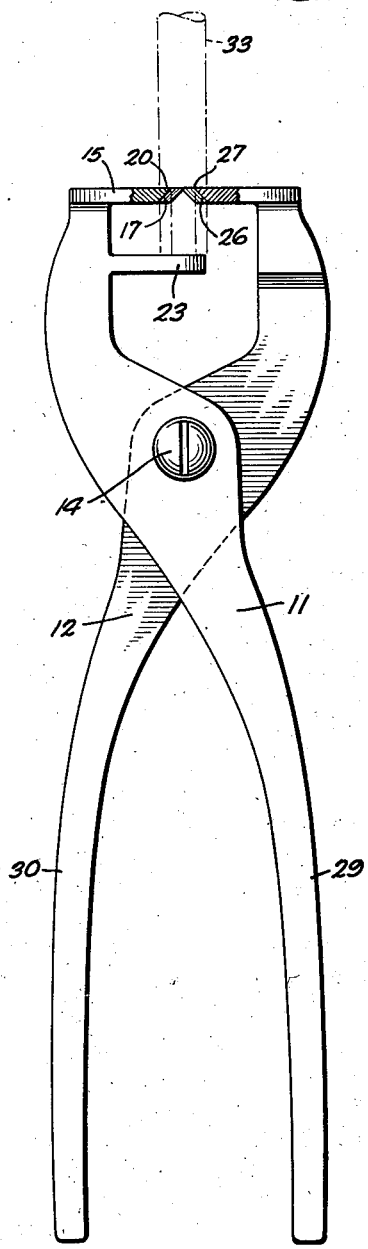
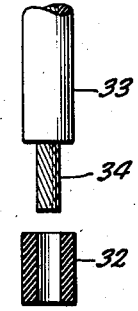
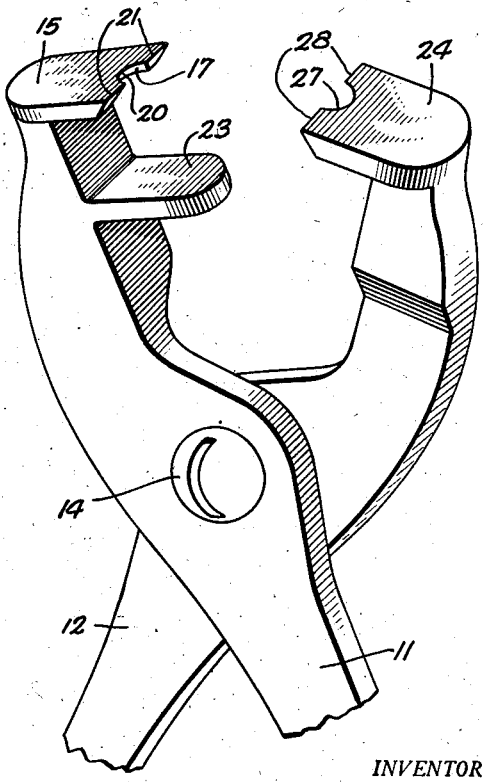

2,386,327

UNITED STATES PATENT OFFICE 2,386,327

INSULATION STRIPPING PLIERS

Samuel M. Martin, Baltimore, Md., assignor to Western Electric Company, Incorporated, New York, N. Y., a corporation of New York Application March 27, 1943, Serial No. 480,877

1 Claim. (Cl. 81—9.5)

This invention relates to insulation stripping pliers and more particularly to pliers for stripping a predetermined length of insulation from a conductor.

In stripping insulation to bare the end of a conductor, it frequently is desirable to strip only a certain length of the insulation therefrom to provide the proper length of the bare conductor needed for making a connection. Previously known insulation strippers have either not been adapted to bare a predetermined uniform length of the conductor or are awkward to operate.

It is an object of this invention to provide new and useful insulation stripping pliers.

A tool embodying the present invention comprises a pair of plier jaws provided with cutting edges having cut out portions therein to surround a conductor from which the insulation is to be stripped and having a stop to be engaged by the insulated conductor to gauge the length thereof to be stripped.

A complete understanding of the invention may be obtained from the following description, taken in conjunction with the accompanying drawing, in which:

Fig. 1 is a side view showing one type of insulation stripping pliers embodying the invention;

Fig. 2 shows an insulated conductor of the type which pliers embodying the invention are designed to strip, and Fig. 3 is an enlarged, fragmentary, perspective view of a portion of the pliers.

The particular embodiment of the invention disclosed in the drawing comprises crossed lever members 11 and 12, which are pivotally connected by a pin 14. A cutting blade 15 is formed on the end of the lever member 11, which has a bevelled arcuate cut out portion 17 therein forming an arcuate cutting edge 20. Straight cutting edges 21—21 are formed on the blade 15, thus forming a continuous cutting edge with the edge 20. A stop 23 is formed integrally on the member 11 parallel to the blade 15. The stop 23 is so located that the distance between the stop and the cutting edge 20 is equal to the length of a conductor that it is desired to bare.

Another cutting blade 24 is formed on the end of the lever member 12 so as to coact with the blade 15. The blade 24 has an arcuate cut out portion 26 similar to the arcuate cut out portion 17, forming an arcuate cutting edge 27 thereon, and straight cutting edges 28—28 which are similar to the edges 21—21. The lever members 11 and 12 have handle portions 29 and 30, respectively, at the ends thereof opposite to the blades 15 and 24.

In stripping a predetermined length of insulation 32 from an insulated conductor 33 to bare a predetermined length of a conductor 34, the insulated conductor 33 is positioned between the blades 15 and 24 with the end thereof abutting the gauge 23. The handle portions 29 and 30 of the members 11 and 12 are drawn together, thereby closing the cutting blades 15 and 24, and forcing the cutting edges through the insulation 32. The pliers are then rotated relative to the insulating conductor 33, causing the cutting edges to sever the insulation 32 completely around the conductor 34. The pliers are then drawn outwardly toward the free end of the conductor 33 with the blades 15 and 24 closed and the length of insulation 32 between the gauge 23 and the blades is stripped from the conductor. Thus, by a very simple operation a predetermined length of insulation may be stripped from an insulated conductor to leave bare a predetermined length of the conductor.

It is obvious that modifications may be made in the particular embodiment of the invention described hereinabove without departing from the spirit and scope of the invention, which is limited only by the appended claim.

What is claimed is:

In insulation stripping tool, which comprises a pair of relatively pivoted plier members, elements positioned transversely on each of the plier members and extending laterally toward the longitudinal axis of the tool, each of the elements having a continuous cutting edge including an arcuate portion and straight portions on each side of the arcuate portion, and a wide, flat projection extending laterally from one of the plier members and crossing said longitudinal axis, said projection being positioned a predetermined distance from the cutting edges to permit the insertion of an insulated conductor between the cutting edges only a predetermined distance.

SAMUEL M. MARTIN.